United States Patent
Ulichney et al.

(10) Patent No.: US 10,027,843 B2
(45) Date of Patent: Jul. 17, 2018

(54) EMBEDDING DATA IN HALFTONE IMAGES

(71) Applicant: Hewlett-Packard Development Company, L.P., Fort Collins, CO (US)

(72) Inventors: Robert Ulichney, Stow, MA (US); Matthew D Gaubatz, Seattle, WA (US); Stephen Pollard, Bristol (GB)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 15/114,392

(22) PCT Filed: Jan. 30, 2014

(86) PCT No.: PCT/US2014/013932
§ 371 (c)(1),
(2) Date: Jul. 26, 2016

(87) PCT Pub. No.: WO2015/116117
PCT Pub. Date: Aug. 6, 2015

(65) Prior Publication Data
US 2016/0344890 A1    Nov. 24, 2016

(51) Int. Cl.
*H04N 1/32* (2006.01)
*G06T 1/00* (2006.01)
*H04N 19/467* (2014.01)
*H04N 1/405* (2006.01)
(Continued)

(52) U.S. Cl.
CPC ......... *H04N 1/32325* (2013.01); *G06T 1/005* (2013.01); *G06T 1/0057* (2013.01); *H04N 1/32277* (2013.01); *H04N 1/4055* (2013.01); *H04N 1/4486* (2013.01); *H04N 5/913* (2013.01); *H04N 19/467* (2014.11);
(Continued)

(58) Field of Classification Search
None
See application file for complete search history.

(56) References Cited

U.S. PATENT DOCUMENTS

| 5,315,098 A | 5/1994 | Tow |
| 5,438,431 A * | 8/1995 | Ostromoukhov .... H04N 1/4058 358/3.18 |

(Continued)

FOREIGN PATENT DOCUMENTS

KR    10-2004-0104716 A    12/2004

OTHER PUBLICATIONS

Chao, R.M. et al, Data Hiding Scheme Using Covering Codes in Haltone Images Based on Error Diffusion, 2008.
(Continued)

*Primary Examiner* — Madelein Nguyen
(74) *Attorney, Agent, or Firm* — Law Office of Doug Weller

(57) ABSTRACT

A data-bearing image (391) is created from a carrier image (371). The carrier image (371) is scaled to produce a scaled image. A clustered-dot halftone screen is applied to the scaled image to produce a halftone image. A resulting number of cells in the halftone image conforms to a cell count (372) that includes a horizontal cell value and a vertical cell value. Payload data is encoded into the halftone image to produce a data-bearing halftone image, including shifting pixel clusters within cells of the halftone image that include pixel clusters.

20 Claims, 8 Drawing Sheets

(51) Int. Cl.
*H04N 1/44* (2006.01)
*H04N 5/913* (2006.01)

(52) U.S. Cl.
CPC ........... *G06T 2201/0051* (2013.01); *G06T 2201/0083* (2013.01); *H04N 2005/91335* (2013.01)

(56) References Cited

U.S. PATENT DOCUMENTS

| | | | |
|---|---|---|---|
| 5,841,458 A * | 11/1998 | Kroon | H04N 1/52 347/115 |
| 6,092,732 A | 7/2000 | Curry | |
| 6,249,355 B1 * | 6/2001 | Trask | H04N 1/4058 358/1.9 |
| 7,782,493 B2 * | 8/2010 | Asai | H04N 1/4051 345/596 |
| 7,995,247 B2 | 8/2011 | Gu | |
| 8,023,160 B2 | 9/2011 | Mongo et al | |
| 8,284,987 B2 * | 10/2012 | Ulichney | H04N 1/32256 382/100 |
| 8,456,699 B2 * | 6/2013 | Ulichney | H04N 1/4055 358/1.9 |
| 8,634,110 B2 * | 1/2014 | Ulichney | H04N 1/4092 358/1.9 |
| 2003/0197878 A1 | 10/2003 | Metois et al. | |
| 2005/0068588 A1 | 3/2005 | Lieberman | |
| 2010/0079770 A1 * | 4/2010 | Bernal | H04N 1/3935 358/1.2 |
| 2010/0079771 A1 * | 4/2010 | Bernal | H04N 1/3935 358/1.2 |
| 2010/0079812 A1 * | 4/2010 | Bernal | H04N 1/393 358/3.06 |
| 2010/0079813 A1 * | 4/2010 | Bernal | H04N 1/393 358/3.06 |
| 2011/0069328 A1 | 3/2011 | Ulichney | |
| 2011/0090537 A1 * | 4/2011 | Fischer | H04N 1/4055 358/3.2 |
| 2013/0044948 A1 * | 2/2013 | Gaubatz | H04N 1/32256 382/166 |
| 2016/0344890 A1 * | 11/2016 | Ulichney | G06T 1/005 |
| 2017/0132800 A1 * | 5/2017 | Ulichney | G06T 7/42 |
| 2017/0163874 A1 * | 6/2017 | Ulichney | H04N 5/23212 |
| 2017/0206535 A1 * | 7/2017 | Gaubatz | G06Q 30/0185 |
| 2017/0308744 A1 * | 10/2017 | Gaubatz | G06K 9/00442 |

OTHER PUBLICATIONS

R. Ulichney et al, "Encoding Information in Clustered-Dot Halftones", Int'l Conf on Digital Printing Technologies, Sep. 2010.

* cited by examiner

EMBEDDING DATA IN HALFTONE IMAGES

BACKGROUND

Encoding information in printed matter can be performed using, for example, bar codes or watermarking. In watermarking, information is hid in continuous-tone image data. Halftoning approximates continuous tone output on devices that are limited in their capability to render continuous tones. For example, halftoning is commonly used in printing where the digital marking engine of black and white printers can only render two levels, black when ink is printed and white (the color of the substrate) when no ink is printed.

BRIEF DESCRIPTION OF DRAWINGS

FIG. 5 shows an example of a redundancy map, in accordance with an implementation.

FIG. 6 shows an example of a redundancy map, in accordance with another implementation.

DETAILED DESCRIPTION

A grayscale image and a payload of data can serve as input to produce a bitonal clustered-dot halftone of the grayscale image with selected halftone clusters shifted to carry bits from the payload. The result is a data-bearing steganographic halftone (i.e., stegatone). To recover the payload data, the data-bearing steganographic halftones can be decoded by comparing the data-bearing steganographic halftones to a reference image derived from the original grayscale image.

Implementations described herein allow for payload data to be recovered even without use of a reference image. This is accomplished by scaling a carrier image to produce a scaled image. A clustered-dot halftone screen is then applied to the scaled image to produce a halftone image. A resulting number of cells in the halftone image conforms to a cell count that includes a horizontal cell value and a vertical cell value. A data-bearing halftone image is produce by encoding payload data into the halftone image.

When the payload data is recovered, the horizontal cell value and the vertical cell value can be used for alignment purposes when locating cells within the data-bearing halftone image. This facilitates recovery of payload data without use of a reference image.

Figure 1:
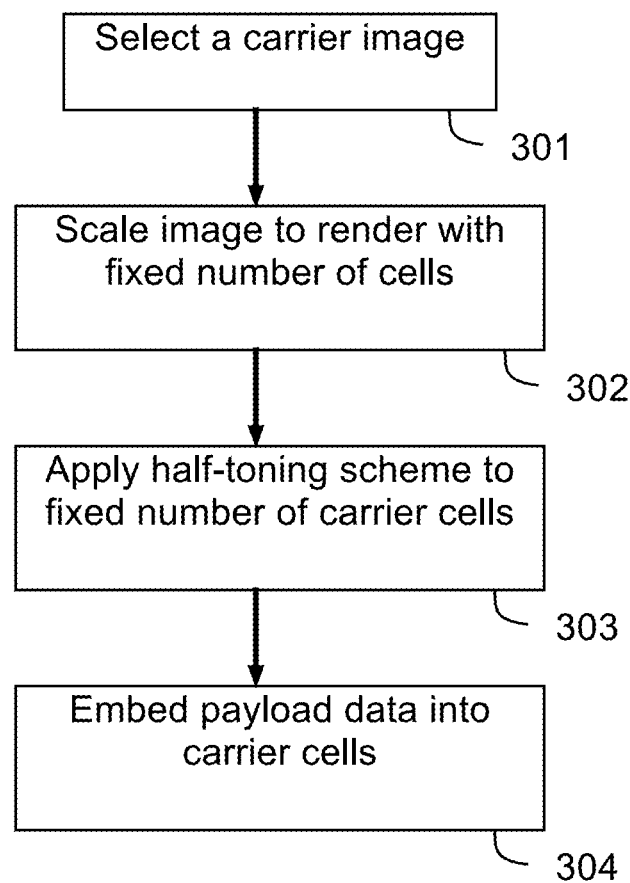
FIG. 1 is a simplified flowchart describing an example of embedding data in halftones in accordance with an implementation.

FIG. 1 is a simplified flowchart describing an example of how payload data can be embedded in halftones so that it is not necessary to utilize a reference image to recover the payload data.

In a block 301, a continuous-tone image is selected to serve as a carrier image for a data payload. The continuous-tone image may be in grayscale or color. In a block 302, a continuous tone image is scaled so that there is a fixed, predetermined, number of cells arranged in a predetermined number of rows and columns.

In a block 303, the image is halftoned. In the halftoning, the image is quantized to two levels to create a halftone image composed of the cells arranged in the predetermined number of rows and columns. The cells will be used as carrier cells for a payload of data.

For example, to produce that halftone, an ordered dither is used that consists of turning on the output bit for a pixel if the intensity level is greater than the threshold of a particular matrix element at that pixel position. Ordered dithering of images can employ clustered-dot and dispersed-dot methods. Clustered-dot halftoning generates dots in "clustered" patterns. In other words, as the input value increases, new pixels added to each pattern are placed adjacent to already-intensified pixels. Clustered-dot halftoning is often used in both dry toner and liquid toner electrophotographic processes, at least in part because they produce dots that are quite stable (i.e., less susceptible to errors and data loss than dispersed-dot techniques). The use of any of the clustered-dot methods known in the art are contemplated for use with the present implementations.

The nature of any ordered dither is dictated by a deterministic, periodic array of threshold values. Ordered dithering employs a dither matrix, which is an array of integer threshold values, to produce the shaded output image. The dither matrix is commonly smaller than the input image, and therefore is repeatedly tiled over the input image. Each color value of the input image is compared against a dither matrix threshold value. When the input value is greater than the threshold value, the output pixel is turned "on". Conversely, if the input value of the pixel is less than or equal to the threshold value, the output pixel is turned "off". It is to be understood that the output described by the relative terms "on" and "off" will depend on the output device. For example, turning "on" a pixel of a halftone display can refer to the pixel going from black to white. However, printing the image with a printer could involve a reversal, in which black pixels represent actual output (i.e. the printing of a dot of black ink). The dither matrix thresholds essentially determine which pixels of the original image are displayed on the output device, and thus the ordering of the threshold values in the dither matrix affects the quality of the output image.

For clustered-dot halftoning, the thresholds are arranged so that output pixels will form ever-increasing white cluster sizes as input values increase from full black, and then ever-decreasing black cluster sizes as input values further increase to full white. The rule or order of thresholds is specified by a dither matrix or dither template.

Two cell types are distinguishable by the spatial arrangement of pixel activation order. Shadow cells produce patterns that manifest as white clusters surrounded by black (i.e., pixels are activated centrally first then progressively to the edges). Highlight cells produce patterns that manifest as black clusters surrounded by white (i.e., pixels are activated first on the edge and then progressively centerward).

The actual threshold values that are to be used to compare against input pixel values can be normalized. This operation may be accomplished to align the mean input intensity with the range of thresholds, or to scale the input range to the threshold range. Known approaches to normalization may be used.

Figure 2:
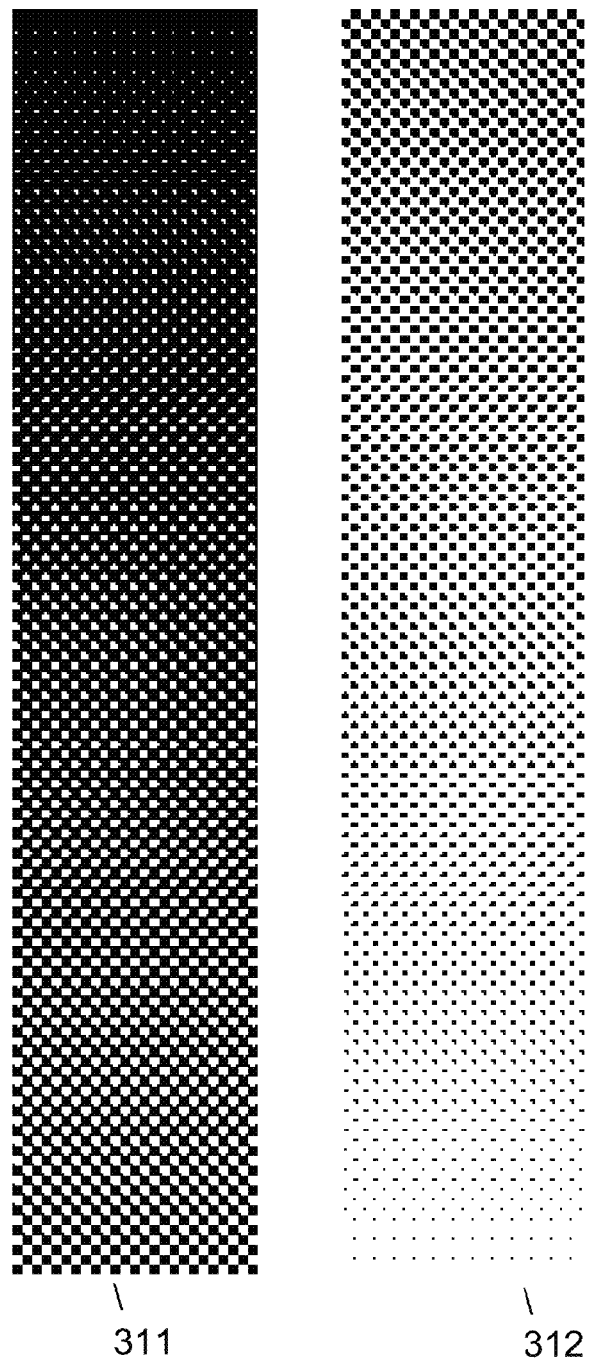
FIG. 2 shows an example of a clustered-dot halftone image using a classical 45-degree screen in accordance with the prior art.

For example, a clustered-dot halftone image using a classical 45-degree screen is created. This approach renders input gray levels that range from black to white as set out in pattern 311 and pattern 312 shown in FIG. 2. The progression of cluster shapes arising from a dither template is used to render constant areas of the input original image. High-frequency detail (e.g., edges) can pass through a dither cell intact, i.e., the shape of the cell will reflect the detail shape, rather than an intensity-dependent cluster. Deviations of these cell shapes in response to such detail is referred to as "partial dots". As a result, the halftoned image more accurately preserves edges and details so as to provide a more accurate rendition of the continuous-tone, original image.

In a block 304 payload data is embedded by means of small shifts of the individual highlight and shadow clusters within each cell. The payload data is placed within the image so that the image can be rendered by an output device into a form that is available for input to a recovery device (e.g. printed as a hardcopy by a printer). U.S. Pat. Nos. 8,456,699 B2 and 8,284,987 B2 can be consulted for additional information known in the art about using small shifts of highlight and highlight clusters to encode information within a cell.

In order to allow recovery without use of a reference image, all cells of the image are deemed information carriers. For example, all cells carry one bit. In this case, the shift rule used to encode data moves the dot clusters in one direction for the "0" state and in another direction for the "1"state for all cells.

While all cells of the image are deemed information carriers, data from at least half of the cells may not be recoverable due to checkerboard subsampling of a halftoning scheme.

Figure 3:
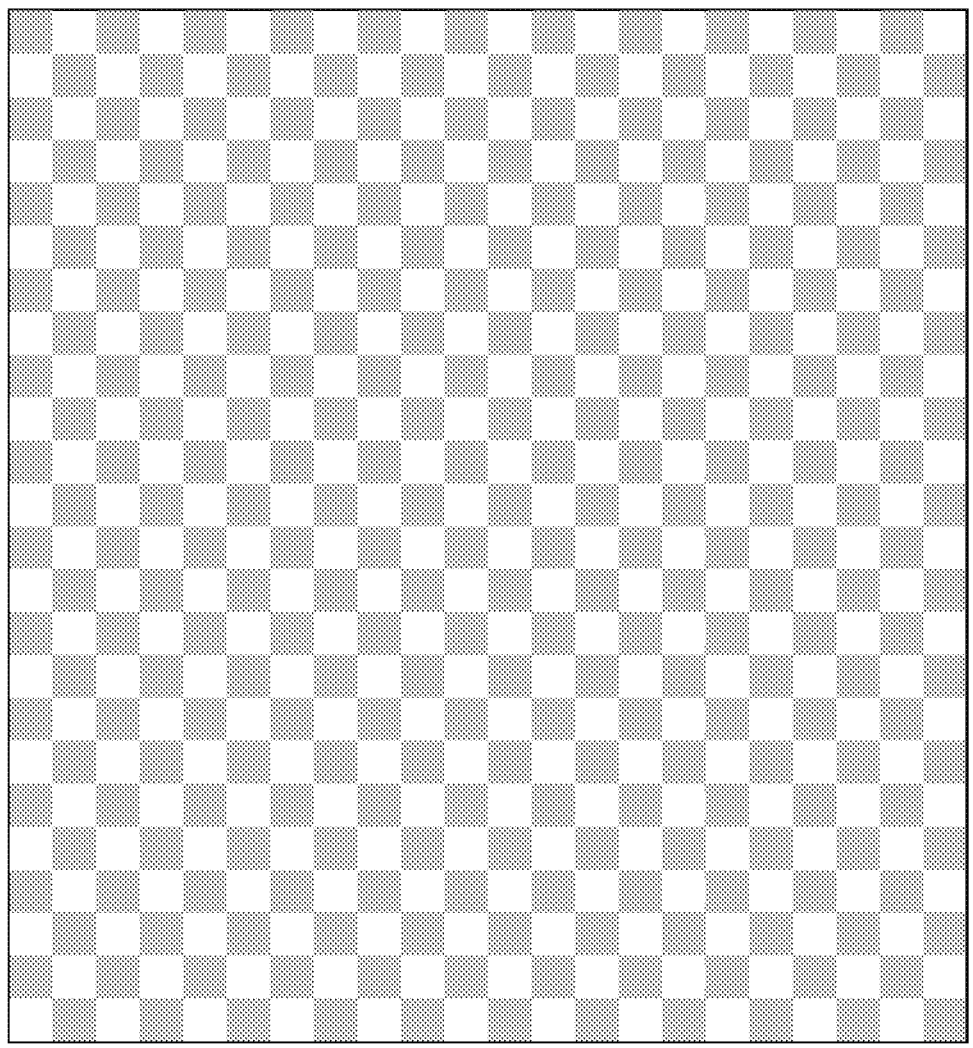
FIG. 3 shows an example template of a fixed size halftone in accordance with the prior art.

For example, FIG. 3 depicts an example template 320 of a fixed size halftone that has 528 cells arranged in twenty-two columns and twenty-four rows. Gray boxes represent highlight cells. Highlight cells consist of small black clusters in areas of highlight and solid black in areas of shadow. White boxes represent shadow cells that consist of small white clusters in areas of shadow and solid white in areas of highlight.

Figure 4:
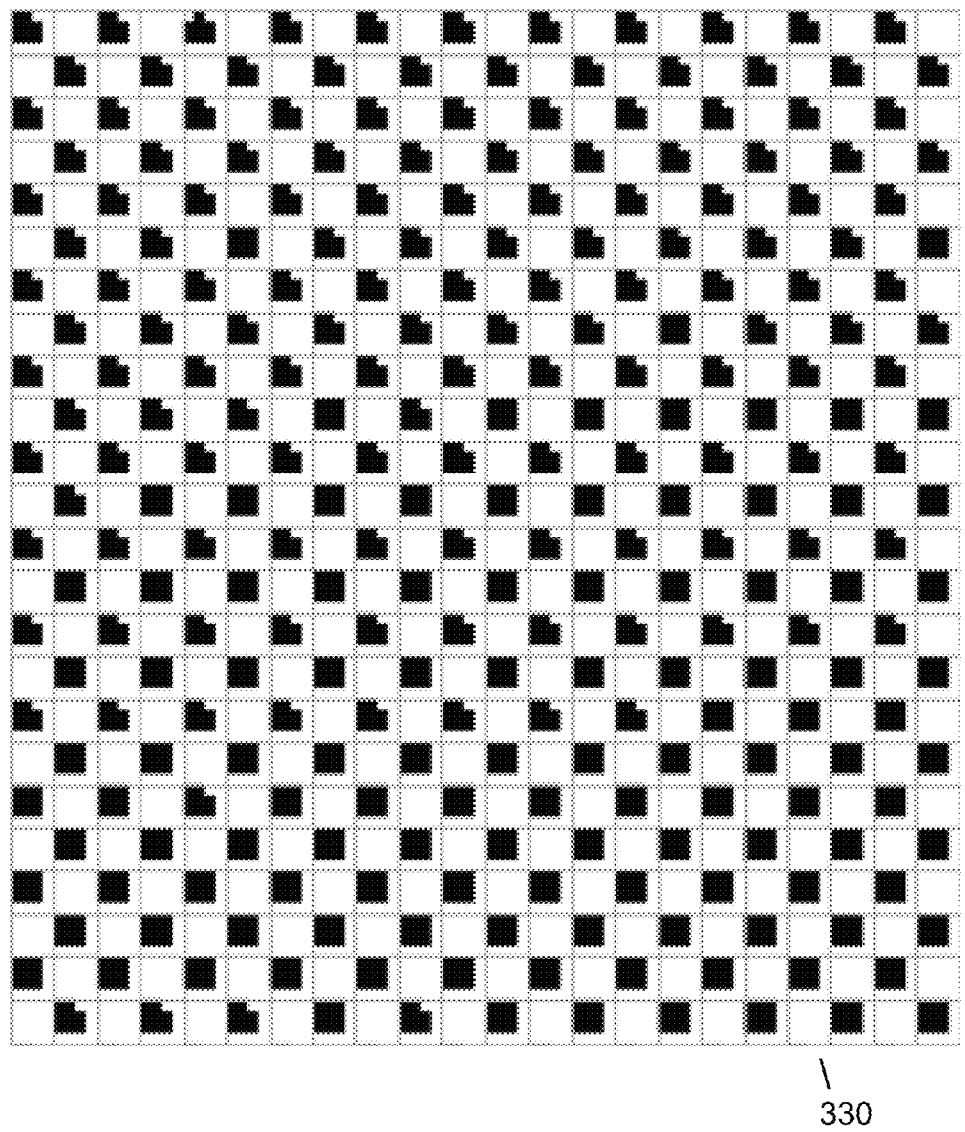
FIG. 4 shows example of an all-highlight image where half of the cells are solid white in accordance with the prior art.

When a cell is solid black or solid white it cannot be shifted and thus can carry no data. An example of an all-highlight image 330 is shown in FIG. 4 where half of the cells are solid white. Similarly if the image were all-shadow, half of the cells would be solid black.

Figure 5:
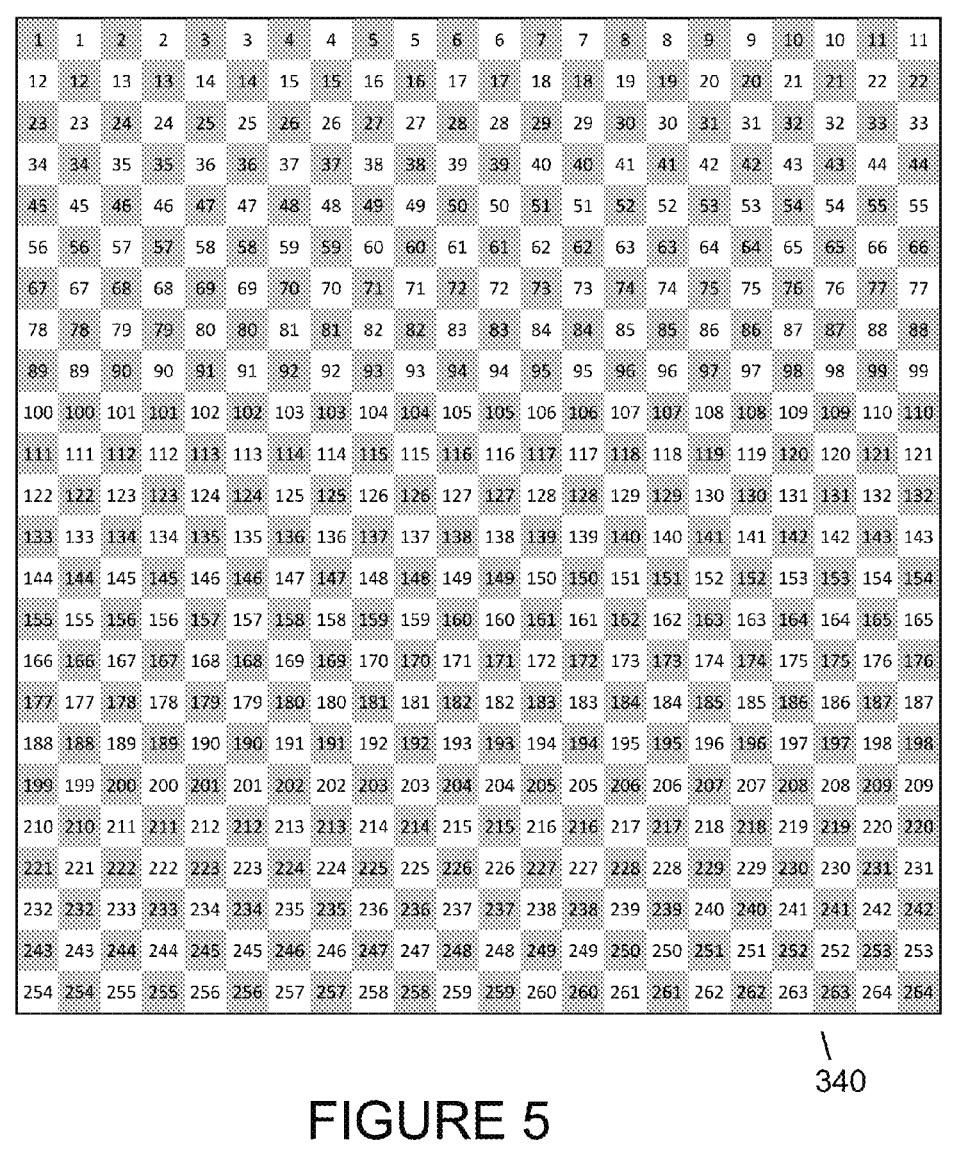

Payload data is inserted into a code string whose bit length is equal to the total number of cells in the fixed-size halftone. For example, FIG. 5 shows a redundancy map 340 where there are 528 cells arranged in 22 columns and 24 rows. Redundancy has been added as part of error correction coding and to account for the checkerboard subsampling to assure all bits of payload data are recoverable. For example, FIG. 5 shows 264 bits of data, numbered in FIG. 5 from 1 to 264. Each bit is duplicated in adjacent cells. This redundancy, reduces the number of bits in the payload in half from 528 bits to 264 bits.

Figure 6:
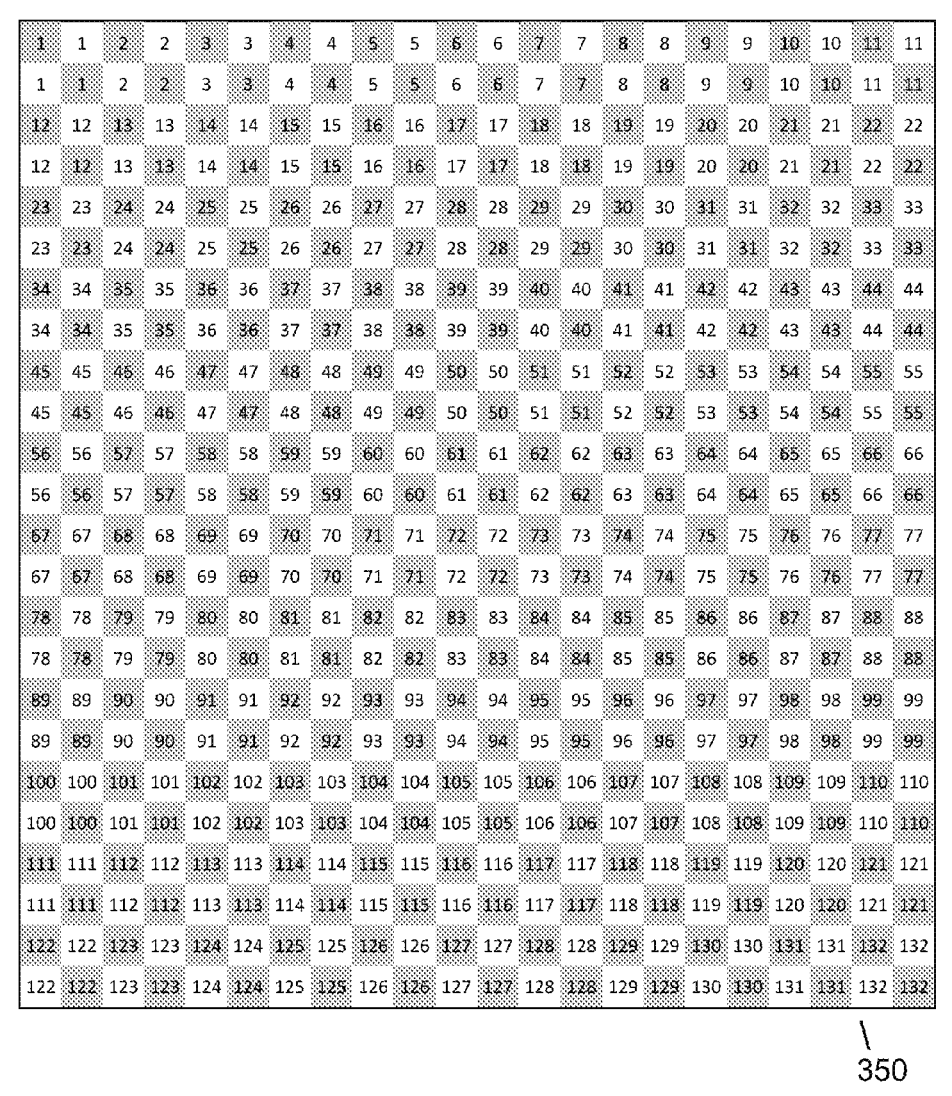

Other redundancy patterns can be used. For example, FIG. 6 shows a redundancy map 350 where there are also 528 cells arranged in 22 columns and 24 rows. Four-fold redundancy has been added so that there are only 132 bits of data, numbered in FIG. 6 from 1 to 132. Each bit is repeated four times in adjacent cells reducing the number of bits in the payload by one-fourth, from 528 bits to 132 bits.

Figure 7:
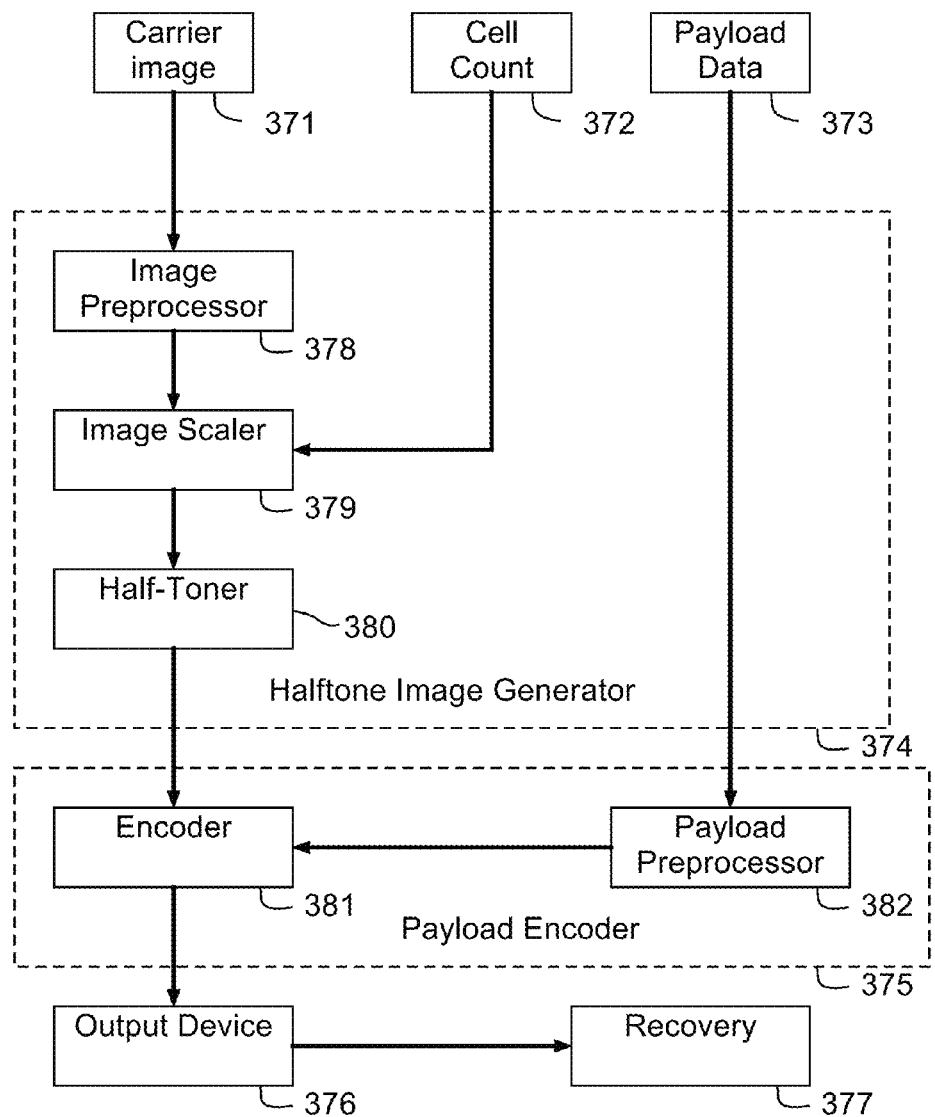
FIG. 7 is a simplified block diagram of an example of a hardware and software system used to embed data in halftones, in accordance with an implementation.

The system that embeds the data payload into a halftoned image can comprise a number of subsystems, devices, and processes. An exemplary arrangement for such a system is illustrated in FIG. 7. The processes performed by the system can include computer code embodied in a device or in computer-readable form. Furthermore, the various subsystems, devices, and processes may be components present in a single machine, such as a scanner/printer or scanner/copier/printer. Alternatively, they may be distributed among different related machines that are used in accordance with the process described herein.

The processes involve receiving inputs (e.g. images, data, specifications, and instructions) as well as producing both intermediate and final outputs (e.g. digital or hardcopy images, image data, and data maps). Accordingly the system and subsystems can include input and output devices conventionally used in the graphics arts for handling items of a given modality. These include, without limitation, input devices such as cameras, scanners, keyboards, compact disk drives, card readers, and the like, as well as output devices such as printers, video displays, video projectors, and the like. A principal input to the system is a carrier image 371. Carrier image 371 can be a continuous-tone image present as a photograph, and may be a standalone representation or may be present in a document. Therefore, an implementation includes inputting the image by way of a scanner or similar device configured for digitizing images. In one aspect, certain processes and subsystems of the present implementation can be integrated into code and/or circuitry such as are found in conventional scanners. In another implementation, carrier image 371 can be a digital image file embodied on computer-readable media.

The system can further include a halftone image generator 374, which is directed to executing the halftoning process. In one aspect of the implementation, the process described herein includes, modifies, and/or replaces the steps carried out by conventional printer processors in printing a halftone rendering of an image. As such, in a particular aspect, halftone image generator 374 can be a printer controller or a component thereof.

In a particular implementation, halftone image generator 374 can include an image preprocessor 378. To produce the eventual data-bearing image, an implementation can involve modifying or replacing the rendering system normally built into the target printer or other output device. Accordingly, the processes performed by image preprocessor 378 can be processes typically associated with preparing an image for printing. In one implementation, image processes can include one or more of decompression of the image, adjusting the image histogram to accommodate non-linearities in the input-to-hardcopy print process, and scaling the image to the device resolution of the printer. Image preprocessor 378 can perform image histogram adjustments to map input gray levels to values that will result in halftone cluster sizes better suited for data recovery. These processes are exemplary of typical preprocessing for rendering, but are not intended to be limiting. Other processes that are associated with rendering images in a given target device are known in the art and can be included in image preprocessor 378.

An image scaler 379 receives as input a cell count 372 and the preprocessed carrier image from image preprocessor 387. Image scaler 379 scales the preprocessed carrier image so that a halftoning process will render a number of cells arranged in a predetermined number of rows and columns in accordance with cell count 372. For example, cell count 372 explicitly indicates a value for rows and a value for columns. Alternatively, cell count 372 implicitly indicates a value for rows and a value for columns, for example based on a set ratio of the number of rows to the number of columns. In another implementation, the cell count and associated horizontal and vertical values are automatically determined from physical size constraint on the output data-bearing halftone.

The next process in halftone image generator 374 can be a halftoner 380. Half-toner 380 can include a cell flattening process where all of the pixels in each cell are set to a single representative value. For example when halftone cells are comprised of 4 by 4 pixels, the cells have all 16 pixels temporarily set to a value equal to their average.

Halftone 380, for example, uses a threshold array to produce a reference image halftone which is forwarded to a payload encoder 375.

Payload encoder 381 also receives payload data 373 to be embedded into the reference image halftone. Payload data 373 can be any type of data amenable to encoding.

In one implementation, payload encoder 381 can operate in sequence with halftone image generator 374. In an alternate implementation, payload encoder 381 can carry out a subset of its operations in parallel with halftone image generator 374.

Payload data 373 can optionally be subjected to one or more preprocessing steps before being encoded. The types of preprocessing that may be suitable or desired will depend on the type of data in the payload as well as the intended use or destination of the data. Accordingly, payload encoder 375 can include a payload preprocessor 382 including various processes needed to yield the desired data format. For example, prevailing security protocols may call for the data to be encrypted, thereby imparting an extra level of security to the payload contents. Encryption methods and techniques are common in the art, and any such approach to encrypting data that provides an output amenable to encoding may be included in the present implementation. According to another implementation, the size of the payload and/or the carrying capacity of the carrier image may make it useful to include data compression.

In a particular implementation, payload preprocessor 382 can include error-correction encoding. Error-correction codes are well known in the art. Particularly useful approaches to error-correction include forward error correction techniques, in which redundant bits are added to encoded data to protect against loss due to sporadic errors in transmission or decoding. One advantage of forward error correction is that errors can be detected without the need for a back-channel. In the context of the present implementation, this could prove to be a considerable advantage. For example, in certain circumstances one-pass acquisition may be the only practical option in recovering payload data 373 from a data-bearing hardcopy.

Payload data 373 is expanded to include redundancy. Recovering errors from encoded digital data in halftone clusters is similar to the error recovery process of encoding data as pits in a compact disk; the compact disk encoding standard calls for approximately triple redundancy in its error-correction encoding to achieve the desired reliability level, to compensate for not only the uncertainties of reading the pits but also to handle anticipated scratches and other degradations. Similarly, data-bearing prints of the present implementations may have uncertainties in the reading of cluster shifts and can suffer degradations by way of smudges and other deformations. The desired robustness of recovery will dictate the degree of redundancy used.

The shift-based encoding is executed on the reference image halftone. In a particular implementation, an encoder 381 receives preprocessed data from payload preprocessor 382 and executes the shifts within the cells of the reference image halftone to generate a data-bearing halftone image. In another implementation, the shift-based encoding is performed directly on the input image, based on statistics and/or measurements computed for each region corresponding to a halftone cell.

For example, the shift rule moves the dot clusters in one direction for the "0" state and in another direction for the "1"state for all cells. Cluster shifting is executed until the complete payload is embedded.

Once the payload data 381 is embedded in the data-bearing halftone image, the data-bearing halftone image can be output using an output device 376. For example, the output device is a printer that prints a hard copy of the data-bearing halftone image. Using a recovery system 377, the payload data can be recovered from the hard copy of the data-bearing halftone image.

Figure 8:
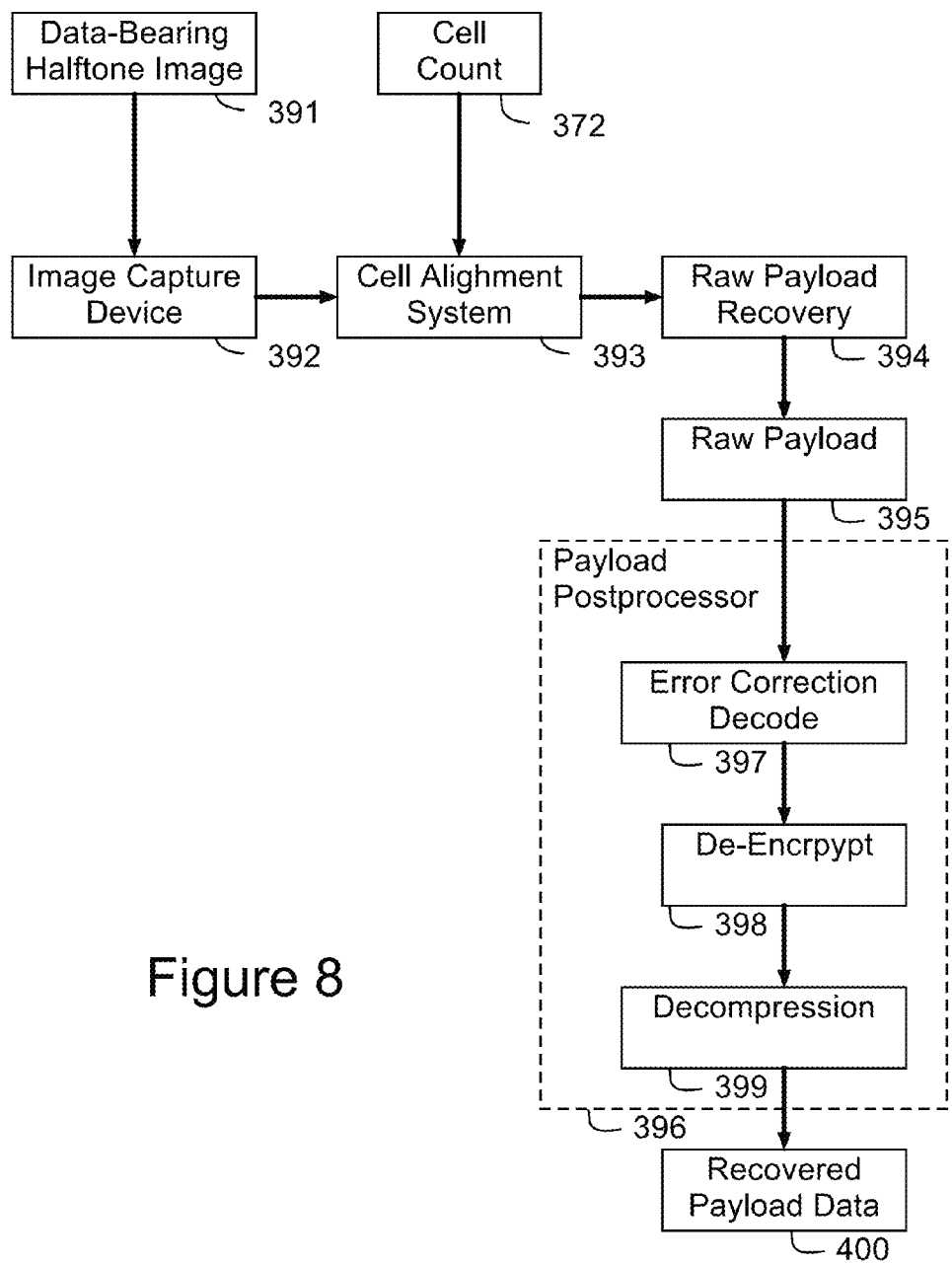
FIG. 8 is a simplified block diagram of a hardware and software system used to recover data in halftones, in accordance with an implementation.

FIG. 8 is a simplified block diagram of a hardware and software system used to recover data in a data bearing halftone image 391. An implementation of such a system for recovering a payload from a data-bearing halftone image can include various sub-systems and/or components. The overall system may include a network of interconnected computers and/or other electronic devices (e.g., scanners, printers, etc.), including virtualized and/or redundant processors, banks of processors and/or servers, etc. It is to be understood that the components of such a system may be implemented in a consolidated location, or portion(s) of the system may be implemented at different locations.

The hardware of at least some of the sub-systems includes an electronic processing device, such as, for example, a controller, a micro controller, a microprocessor, a host processor, an application specific integrated circuit (ASIC), and/or a reprogrammable hardware logic device (such as a field programmable gate array (FPGA)). It is to be understood that the electronic processing device may be a processor working in conjunction with a central processing unit (CPU) performing the function of a general-purpose processor. Computer program(s) and/or software (e.g., computer readable code) may be loaded onto one or more of the sub-systems, and stored in a memory thereof. Such programs and/or software are executable via a processing device.

For example, data bearing halftone image 391 is part of a hardcopy image that is incorporated into a document that includes data bearing halftone image 391 and in addition may include one or more images. The method of recovery will depend to a degree on the format in which the data-bearing halftone image is provided. The discussion of recovery will be directed mostly to approaches typically used on print images. However, the principles discussed herein can be adapted to deal with other formats, such as digital files.

When data bearing halftone image 391 is in the form of a hard copy, a image capture device 392, such as a scanner or a camera, can be used to obtain a digital version. Capturing a printed image by an image capture device can raise issues, arising both from the printer (e.g. dot gain, black-white non-linearities) and the image capture device (e.g. positioning, alignment, scaling, zooming). Any suitable image capture device 392 may be used to generate the digital version of data-bearing halftone image 391 as long as the resolution of the image capture device 392 is sufficiently high to allow recognition of shifted positions within cells of halftone image 391.

Cell alignment system 393 utilizes cell count 372, including the indication of the number of rows and columns, to identify cell locations within data-bearing halftone image 391. In addition, specific methods can also be used for locating the position of the data-bearing halftone image in the scanned image, for de-skewing the scanned image, for fine tuning the horizontal and vertical scale factors, and for determining the boundaries of the halftone cells. During the recovery process, the cell count can be combined with estimates of scale, orientation and other recoverable parameters to determine a boundary, that, when correctly placed, delimits the approximate location of the captured data-bearing halftone. Various iterative measurements can be used to estimate the efficacy of a given candidate location of the boundary. For instance, the approximate location of the data-bearing halftone image can be determined, in one implementation, by a pixel-based correlation operation or a multi-scale correlation operation, using either binary or grayscale image data. Skew information can be assessed via blind or comparative Hough transform analysis. In another implementation, the locating, de-skewing and fine-tuning operations involve iterating over several possible sets of transformation parameters, performing spatial transforms defined by those parameters on the scanned image, and choosing the set of parameters that results in the transformed image that most closely resembles the reference halftone, or a proxy for the reference halftone, such as a predefined grid or other pattern. A measurement of closeness may be determined by mean-squared-error, correlation, Hough transform-based comparisons, estimation of decoding errors via error correction schemes, or other functions capable of quantifying differences in images. In addition, fiducial markings and/or other image content printed on the same page could be used to assist in the alignment process to further constrain the set of the locations where the boundary delimiting the data-bearing halftone can exist.

Alignment can be global (i.e., across the entire scanned image), affine and non-affine (i.e., correct for skew, shift, orientation, warp, and other distortion(s)), or selective/graded. When selective or graded alignment is used, the user of the cell alignment system 393 can assess which portion(s) of the scanned image are of sufficient quality in order to obtain reliable payload information, and align that/those portion(s) of the scanned image. Larger images may also have sub-regions that are independently (or neighbor-dependently) registered.

The result of the cell alignment system 393 is an aligned scan. The aligned scan is then input into a raw payload recovery system 395. The goal of the raw payload recovery system 395 is to detect the individual shift positions of each cell of the aligned scan.

In order to detect the individual shift positions of each cell of the aligned scan, a number of processes can be performed by the raw payload recovery system 395. Two non-limiting examples of suitable methods include minimizing mean-square-error and centroid matching. Other suitable methods include choosing the shifted cell with the most black pixels in the same location as a binarized version of the scanned cell; correlation maximization; or mutual information maximization. It is to be understood that these methods could involve serial, iterative, and/or global processing to determine the shifts associated with all cells.

Minimizing mean-square-error finds the minimum difference in terms of the mean-square-error between the scanned cells and the valid candidate shifted cell images. Minimizing mean-square-error may be advantageous because it yields strong performance, even when the data is very noisy and an appropriate cell binarization strategy may not be apparent. Centroid matching involves binarizing each scanned cell, and comparing the location of the centroid of each cell with the location of the centroids of the corresponding valid candidate shifted cell images. Centroid matching may be advantageous because it can be applied on any size aligned scan and because of its speed, which is a result of the process accessing the pixels in the scanned cell one single time.

Raw payload recovery system 395 examines each cell and determines if the results is "0" and "1" or "abstain". An "abstain" is rendered if the shift is too ambiguous or if it is determined to be an area of all highlight or all shadow. The state of bits will be averaged according to the redundancy map to determine the payload bits, where abstentions are excluded from the averages.

Recovered raw payload data can be passed to a payload postprocessor 396, which includes, for example, sub-systems that are programmed to perform one or more processes to undo or reverse any processes performed on the payload during encoding. As such, the goal of payload postprocessor 396 is to invert any transformations to the data applied by a payload preprocessor in the encoding system. Payload postprocessor sub-systems 396 may include, for example, an error correction decoding system 397, a de-encryption system 398, and a decompression system 399. Error correction decoding system 397 uses parity or other redundant forms of coding to compensate for incorrectly recovered bits. De-encryption system 398 de-encrypts the data, which in some instances is error-corrected data. Decompression system 399 decompresses the data to produce recovered payload data 400.

The disclosed subject matter may be implemented in other specific forms without departing from the spirit or characteristics thereof. Accordingly, the present disclosure is intended to be illustrative, but not limiting, of the scope of the following claims.

We claim:
1. A system that creates a data-bearing image, comprising:
 a halftone image generator that receives a carrier image (371), the halftone image generator including:
  an image scaler that scales the carrier image to produce a scaled image, and
  a halftoner that applies a clustered-dot halftone screen to the scaled image to produce a halftone image so that a resulting number of cells in the halftone image conform to a cell count that includes a horizontal cell value and a vertical cell value;
 an encoder that produces a data-bearing halftone image by encoding payload data into the halftone image, including shifting pixel clusters within cells of the halftone image that include pixel clusters; and,
 an output device configured to output the data-bearing halftone image.

2. A system as in claim 1 wherein the output device is a printer that is configured to print a hard copy of the data-bearing halftone image.

3. A system as in claim 1 wherein the halftone image generator includes an image preprocessor that performs preprocessing on the carrier image before the carrier image is scaled.

4. A system as in claim 1 wherein the encoder includes a preprocessor that performs preprocessing on the payload data before encoding the payload data into the halftone image.

5. A system as in claim 1 wherein the encoder includes a preprocessor that performs preprocessing on the payload data before encoding the payload data into the halftone image, the preprocessing including at least one of the following:
 error correction encoding;
 encryption;
 data compression.

6. A system as in claim 1 wherein the encoder encodes at most one bit of data in each cell.

7. A system as in claim 1 wherein every bit of data in the payload data is redundantly assigned to more than one cell in the cells of the scaled image.

8. A system as in claim 1 wherein the cell count is determined from physical size constraints associated with the data-bearing halftone image.

9. A system as in claim 1 wherein the system additional recovers the data payload from the data-bearing halftone image, and wherein the system additionally comprises:
 a cell alignment block that receives the data-bearing halftone image and uses the cell count including the horizontal cell value and the vertical cell value to locate cells within the data-bearing halftone image; and,
 raw payload recovery block that detects shifting of pixel clusters within the cells within the data-bearing halftone image to recover the payload data encoded within the data-bearing halftone image.

10. A system as in claim 9 additionally comprising:
 a payload post processor that performs post processing on the recovered data to produce the payload data.

11. A system as in claim 9 additionally comprising:
 an image capture device that captures a hard copy that includes the data bearing halftone image, the image capture device producing a digital version of the data-bearing halftone image that the image capture device forwards to the cell alignment block.

12. A system as in claim 9, wherein an estimate of the scale of the image is combined with cell count to determine a boundary that, when correctly placed, delimits the captured data-bearing halftone image.

13. A system as in claim 12, wherein the boundary is combined with iterative measurements to determine the location of the captured data-bearing halftone image.

14. A method for creating a data-bearing image, comprising;
 receiving a carrier image;
 scaling the carrier image to produce a scaled image;
 applying a clustered-dot halftone screen to the scaled image to produce a halftone image,
 encoding payload data into the halftone image to produce a data-bearing halftone image, including:
  determining cell count including associated horizontal and vertical values from physical size constraint on the data-bearing halftone image; and,
 using a hardware output device to produce the data-bearing halftone image with the determined cell count.

15. The method of claim 14, further comprising:
 receiving the data-bearing halftone image;
 using the cell count including the horizontal cell value and the vertical cell value to locate cells within the data-bearing halftone image; and,
 detecting shifting of pixel clusters within the cells within the data-bearing halftone image to recover the payload data encoded within the data-bearing halftone image.

16. A system to recover a data payload from a data-bearing halftone image, comprises:
 a cell alignment block that receives the data-bearing halftone image and uses the cell count including the horizontal cell value and the vertical cell value to locate cells within the data-bearing halftone image; and,
 raw payload recovery block that detects shifting of pixel clusters within the cells within the data-bearing halftone image to recover the payload data encoded within the data-bearing halftone image.

17. The system of claim 16, further comprising:
 a payload post processor that performs post processing on the recovered data to produce the payload data.

18. The system of claim 16, further comprising:
 an image capture device that captures a hard copy that includes the data-bearing halftone image, the image capture device producing a digital version of the data-bearing halftone image that the image capture device forwards to the cell alignment block.

19. The system of claim 16, wherein an estimate of the scale of the image is combined with cell count to determine a boundary that, when correctly placed, delimits the captured data-bearing halftone image.

20. The system of claim 19, wherein the boundary is combined with iterative measurements to determine the location of the captured data-bearing halftone image.

\* \* \* \* \*

UNITED STATES PATENT AND TRADEMARK OFFICE
CERTIFICATE OF CORRECTION

PATENT NO. : 10,027,843 B2
APPLICATION NO. : 15/114392
DATED : July 17, 2018
INVENTOR(S) : Robert Ulichney et al.

Page 1 of 1

It is certified that error appears in the above-identified patent and that said Letters Patent is hereby corrected as shown below:

In the Drawings

In sheet 8 of 8, FIG. 8, reference numeral 393, Line 1, delete "Alighment" and insert -- Alignment --, therefor.

In sheet 8 of 8, FIG. 8, reference numeral 398, Line 1, delete "De-Encrpypt" and insert -- De-Encrypt --, therefor.

In the Claims

In Column 8, Line 35, Claim 1, before "the" delete "(371)".

In Column 9, Line 26 (approx.), Claim 11, delete "data bearing" and insert -- data-bearing --, therefor.

In Column 9, Lines 37-38 (approx.), Claim 14, delete "comprising;" and insert -- comprising: --, therefor.

Signed and Sealed this
Twenty-sixth Day of February, 2019

Andrei Iancu
*Director of the United States Patent and Trademark Office*